(12) United States Patent
Watts

(10) Patent No.: US 11,845,640 B1
(45) Date of Patent: Dec. 19, 2023

(54) CRANE ASSEMBLY

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 392 days.

(21) Appl. No.: 17/354,758

(22) Filed: Jun. 22, 2021

Related U.S. Application Data

(60) Provisional application No. 63/042,461, filed on Jun. 22, 2020.

(51) Int. Cl.
| | |
|---|---|
| *B66F 11/04* | (2006.01) |
| *B66C 23/18* | (2006.01) |
| *G03B 17/56* | (2021.01) |
| *B66C 5/02* | (2006.01) |

(52) U.S. Cl.
CPC .......... *B66F 11/048* (2013.01); *B66C 23/18* (2013.01); *G03B 17/561* (2013.01); *B66C 5/025* (2013.01)

(58) Field of Classification Search
CPC ..... G03B 17/561; B66F 11/048; B66C 5/025; B66C 23/18; F16M 11/24; F16M 11/245
See application file for complete search history.

(56) References Cited

U.S. PATENT DOCUMENTS

| | | | | |
|---|---|---|---|---|
| 5,531,412 | A * | 7/1996 | Ho | F16M 11/2092 396/428 |
| 6,752,541 | B1 * | 6/2004 | Dykyj | B66F 11/048 248/176.1 |
| 7,293,668 | B2 * | 11/2007 | Brossart | B66C 23/48 212/175 |
| 10,054,257 | B1 * | 8/2018 | Snoke | G03B 17/561 |
| 10,309,581 | B2 * | 6/2019 | Underwood | F16B 7/105 |
| 2012/0223193 | A1 * | 9/2012 | Hurley | F16M 11/2014 248/163.1 |
| 2018/0023754 | A1 * | 1/2018 | Hashiguchi | H04N 23/50 396/428 |

FOREIGN PATENT DOCUMENTS

GB          2505761 A  *  3/2014  ............. A47G 21/14

* cited by examiner

*Primary Examiner* — Christopher E Mahoney
(74) *Attorney, Agent, or Firm* — Plager Schack LLP; Mark H. Plager; Michael J. O'Brien

(57) ABSTRACT

A crane assembly is configured to move a camera. The crane assembly has a base support assembly which includes a box support, joined to at least three box leg sleeves extending outward and downward from the box support. A plurality of legs where each leg is joined to one of the box leg sleeves. A plurality of drop in leg forks where each drop in leg fork joined is to at least one of the legs. A plurality of spreader bars where each spreader bar is joined to two of the drop in leg forks.

3 Claims, 6 Drawing Sheets

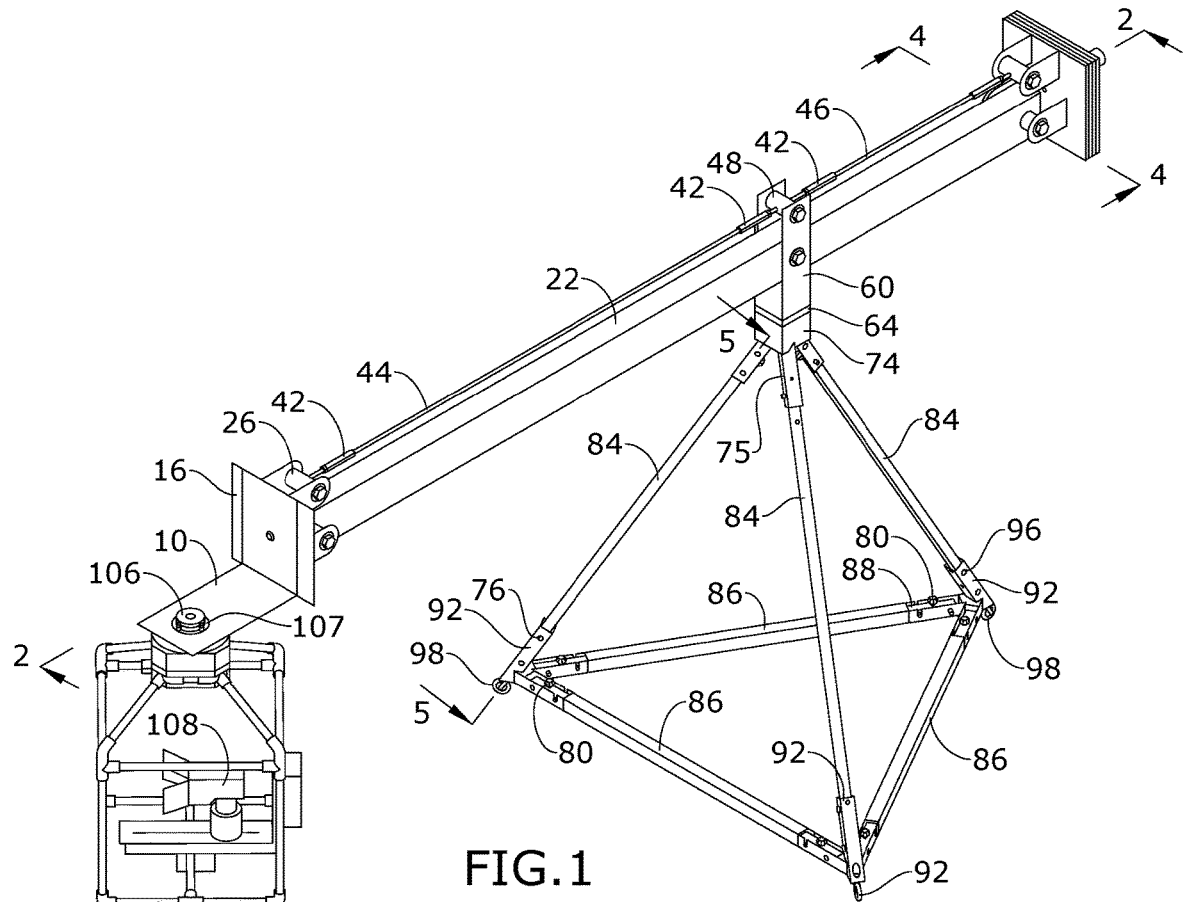
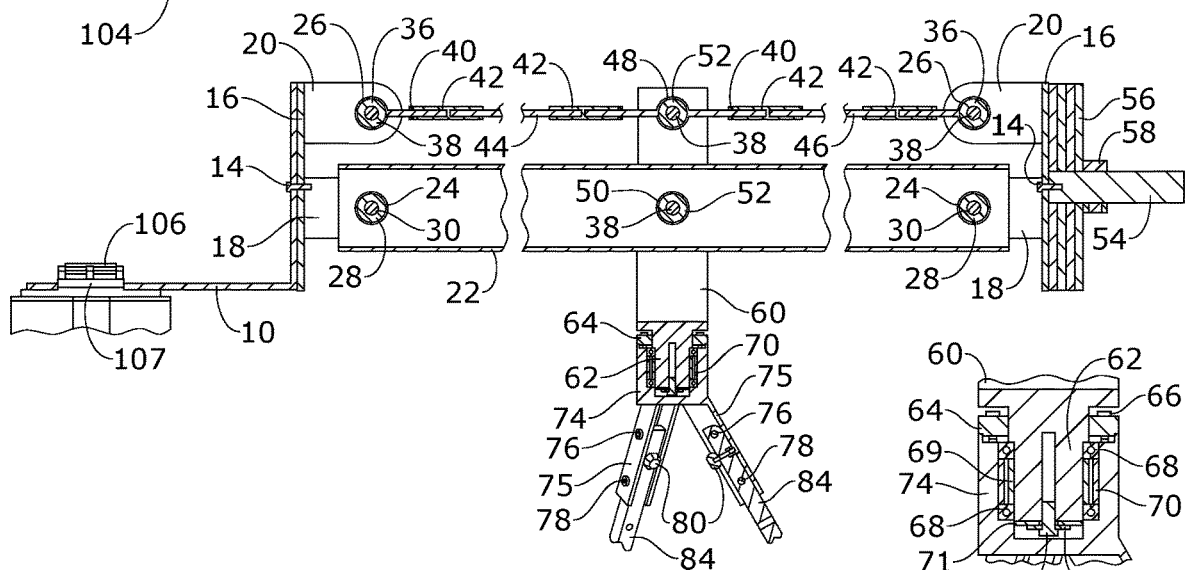

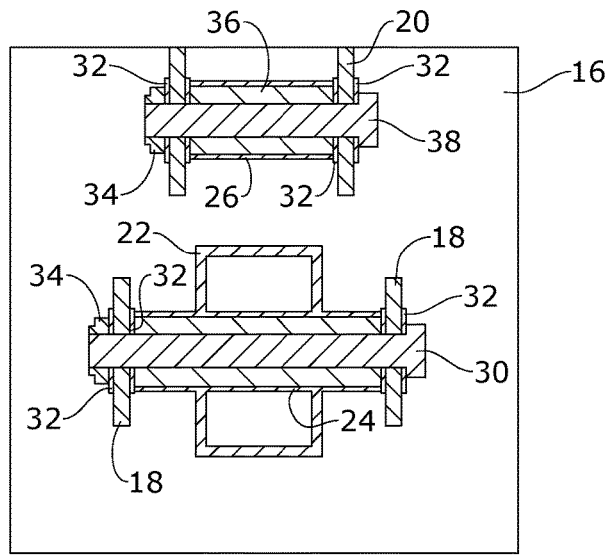
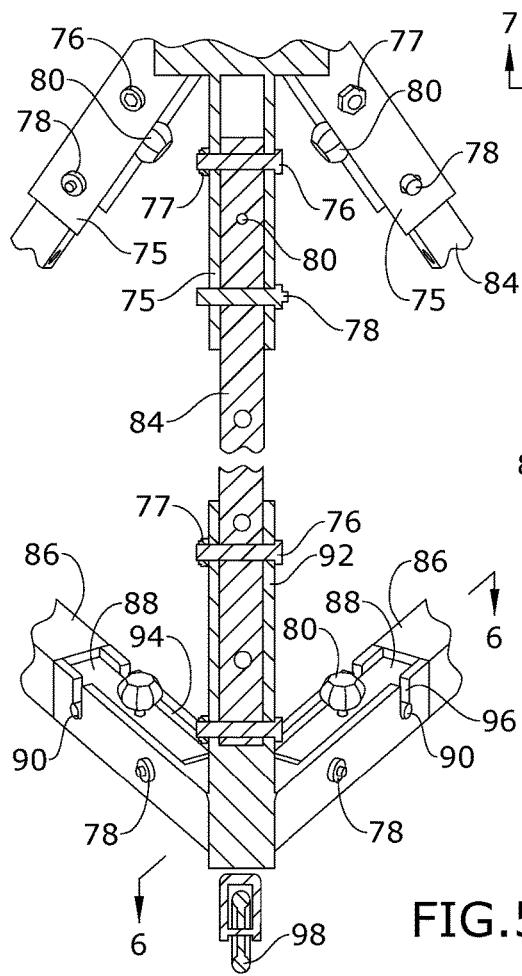
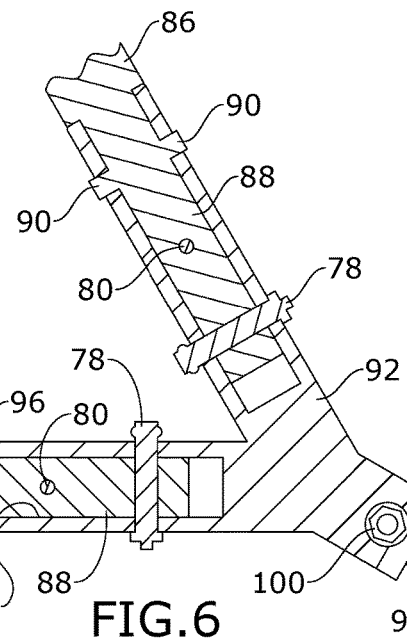
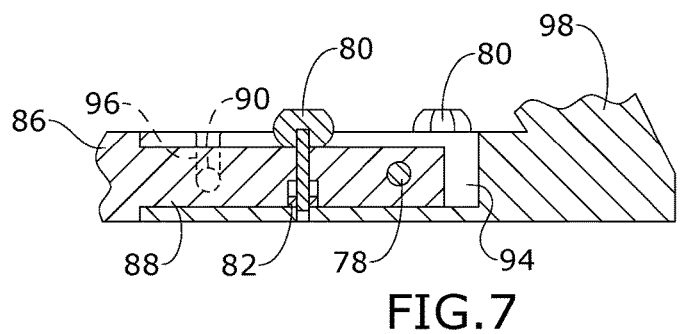

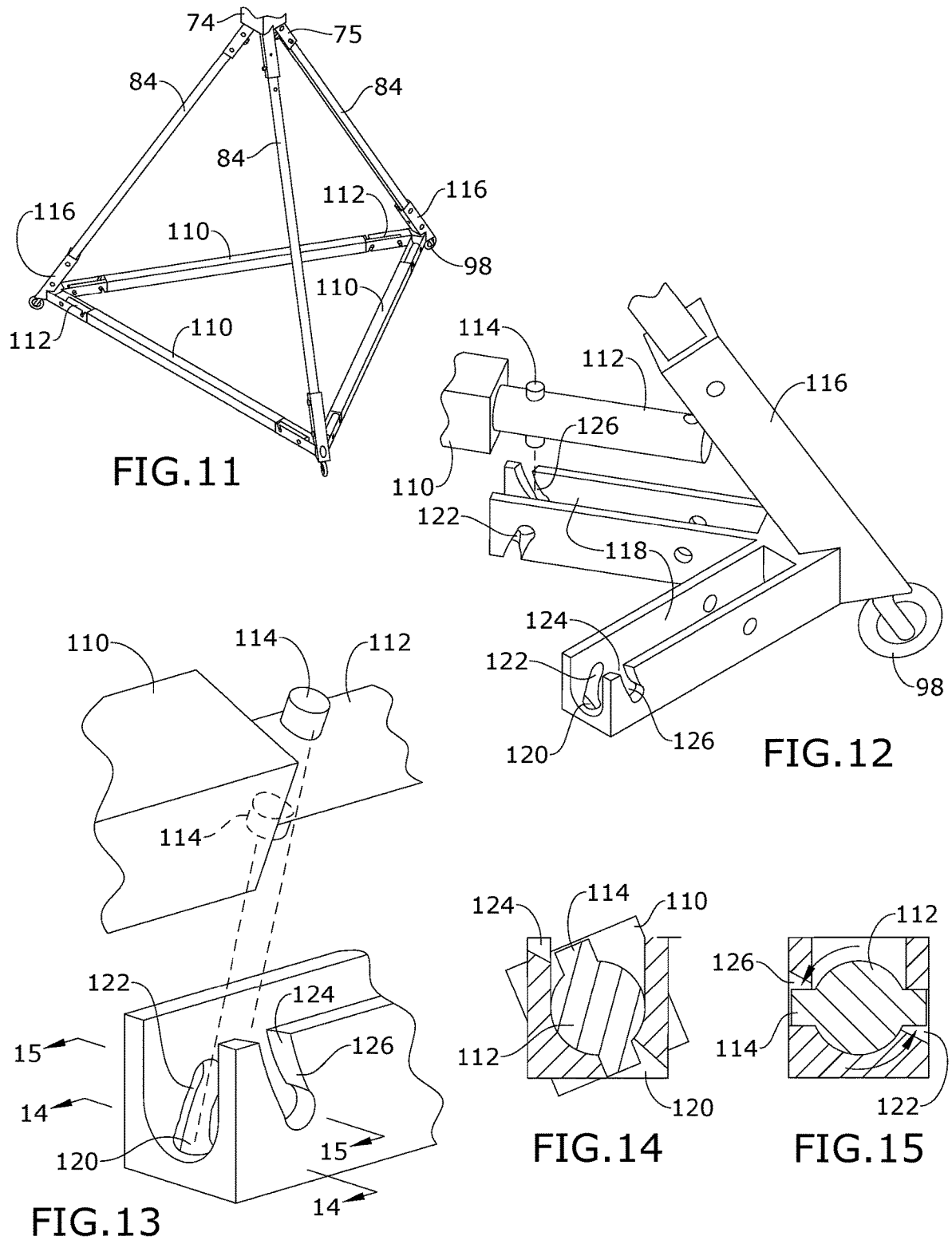

CRANE ASSEMBLY

RELATED APPLICATION

This application claims priority to provisional patent application U.S. Ser. No. 63/042,461 filed on Jun. 22, 2020, the entire contents of which is herein incorporated by reference.

BACKGROUND

The embodiments herein relate generally to video production technology. Some other endeavors in this field include: U.S. Pat. No. 10,309,581 issued to Underwood; U.S. Pat. No. 7,293,668 issued to Brossart; and U.S. Pat. No. 5,531,412 issued to Ho.

Prior to embodiments of the disclosed invention, most cranes were treated with outer coating that was not long lasting or weather resistant. Other cranes had a center post which added to weight. Cranes of this size were not easily collapsible.

SUMMARY

A crane assembly is configured to move a camera. The crane assembly has a base support assembly which includes a box support, joined to at least three box leg sleeves extending outward and downward from the box support. A plurality of legs where each leg is joined to one of the box leg sleeves. A plurality of drop in leg forks where each drop in leg fork joined is to at least one of the legs. A plurality of spreader bars where each spreader bar is joined to two of the drop in leg forks.

BRIEF DESCRIPTION OF THE FIGURES

The detailed description of some embodiments of the invention is made below with reference to the accompanying figures, wherein like numerals represent corresponding parts of the figures.

FIG. 1 shows a perspective view of one embodiment of one embodiment of one embodiment of the present invention;

FIG. 2A is a section view of one embodiment of one embodiment of one embodiment of the invention, taken along line 2-2 in FIG. 1;

FIG. 2B is a detail section view of one embodiment of one embodiment of one embodiment of the invention;

FIG. 4 is a section view of one embodiment of the invention, taken along line 4-4 in FIG. 1;

FIG. 5 is a section view of one embodiment of the invention, taken along line 5-5 in FIG. 1;

FIG. 6 is a section view of one embodiment of the invention, taken along line 6-6 in FIG. 5;

FIG. 7 is a section view of one embodiment of the invention, taken along line 7-7 in FIG. 6;

FIG. 11 is a detail perspective view of one embodiment of an alternate embodiment of one embodiment of the invention FIG. 12 is a detail perspective view of one embodiment of an alternate embodiment of one embodiment of the invention, illustrating the removal of one embodiment of twist-in spreader bar 110

FIG. 13 is a detail exploded view of one embodiment of the invention, showing the initial placement of one embodiment of posts 114 for twist-in assembly FIG. 14 is a section view of one embodiment of the invention, taken along line 14-14 in FIG. 13, showing the first position of one embodiment of posts 114 for twist-in assembly;

FIG. 15 is a section view of one embodiment of the invention, taken along line 15-15 in FIG. 13, showing posts 114;

DETAILED DESCRIPTION OF CERTAIN EMBODIMENTS

Figure 3:
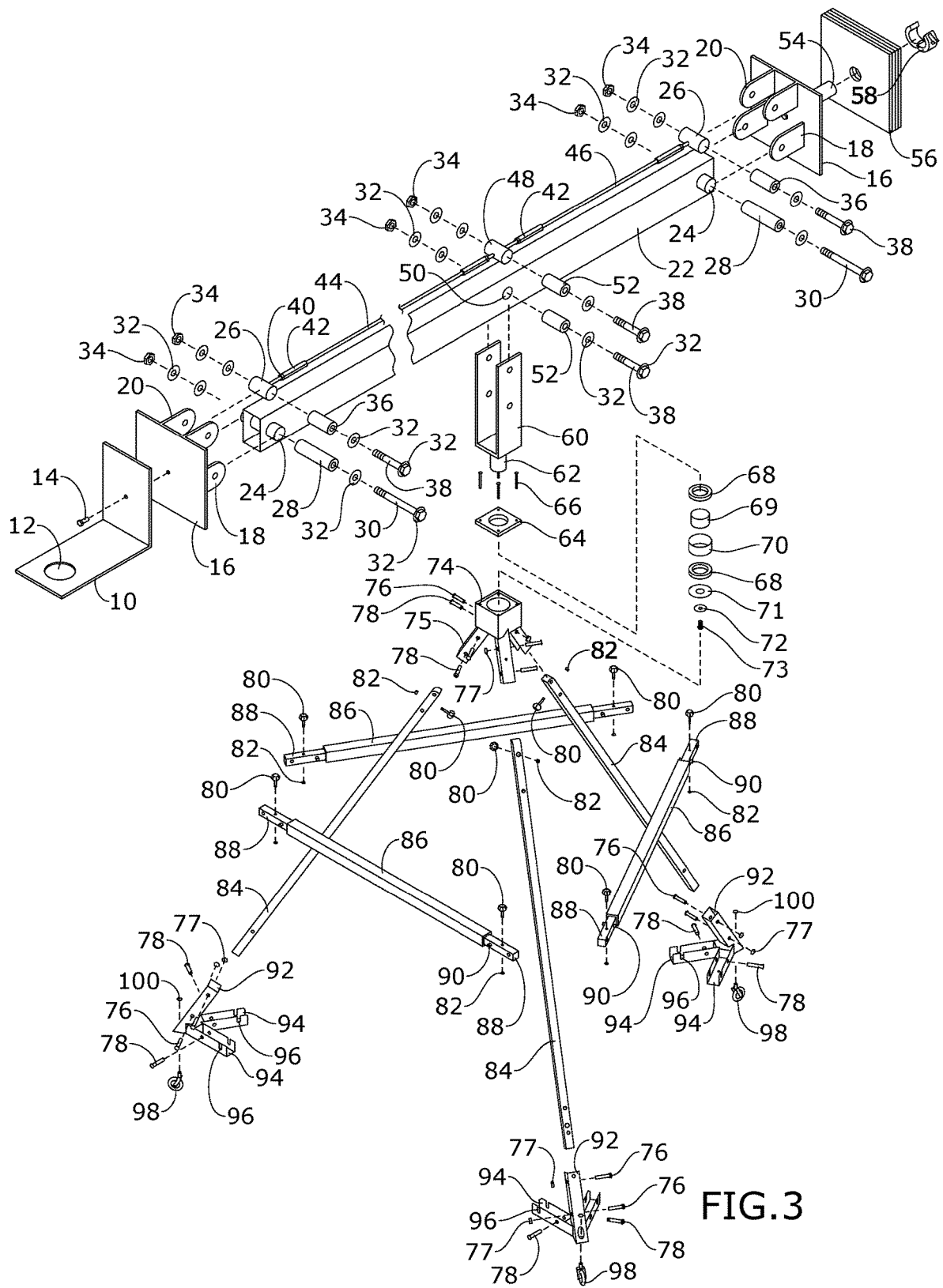
FIG. 3 shows an exploded view of one embodiment of one embodiment of one embodiment of the present invention.
Figure 8:
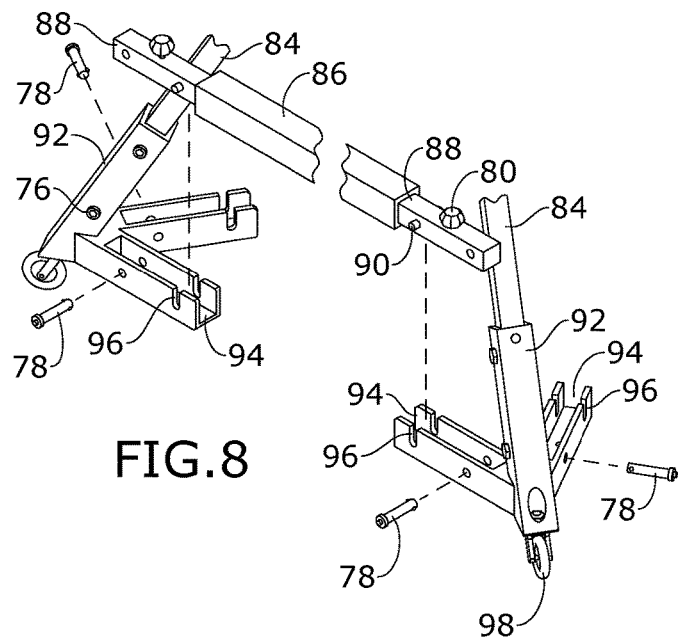
FIG. 8 is a detail perspective view of one embodiment of the invention, illustrating the removal of one embodiment of spreader bars 84
Figure 9:
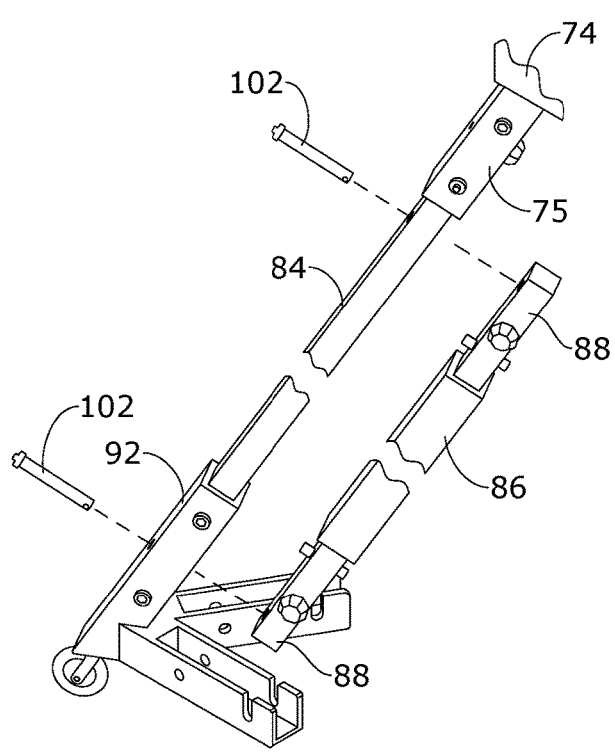
FIG. 9 is a detail perspective view of one embodiment of the invention, illustrating the attachment of one embodiment of spreader bar 86 to leg 84 for storage
Figure 10:
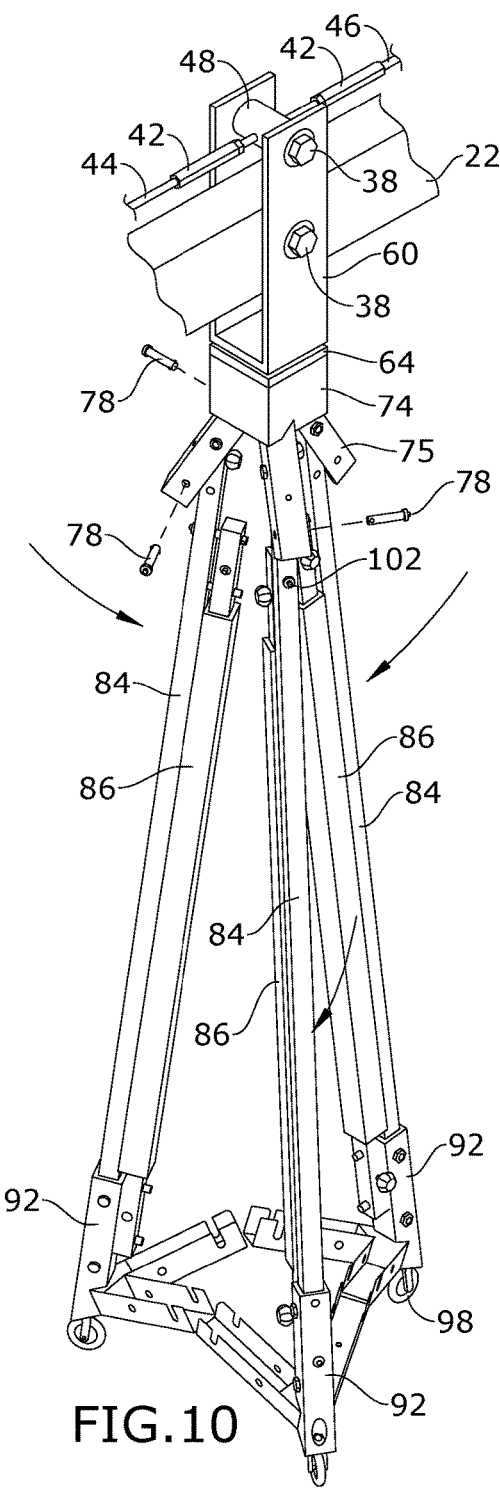
FIG. 10 is a detail perspective view of one embodiment of the invention, illustrating collapsing of one embodiment of legs 86
Figure 16:
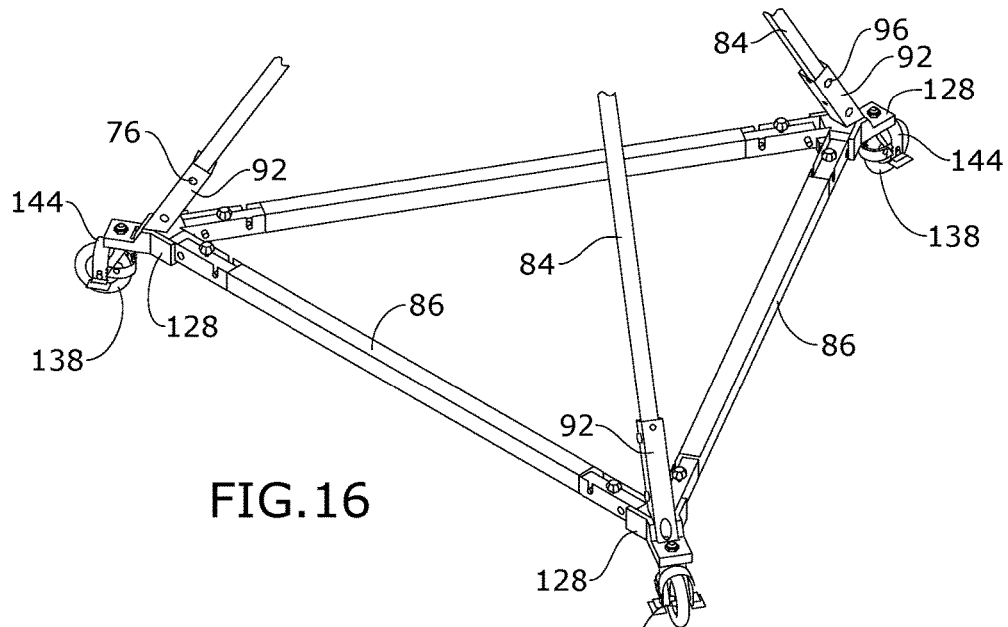
FIG. 16 is a detail perspective view of one embodiment of the present invention.
Figure 17:
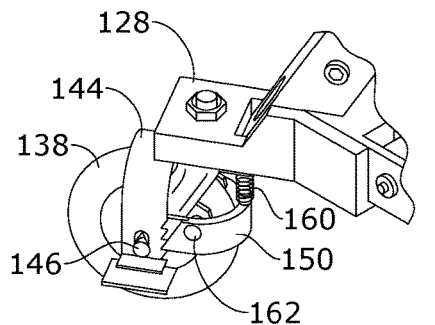
FIG. 17 is a detail perspective view of one embodiment of a braked wheel of one embodiment of the present invention.
Figure 18:
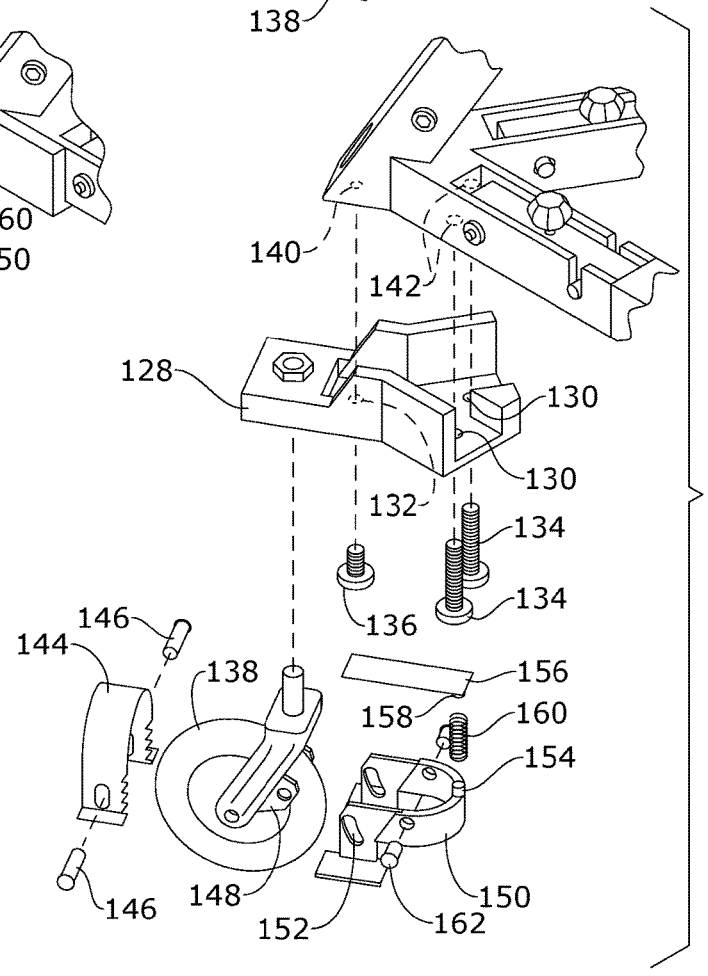
FIG. 18 is a detail exploded view of one embodiment of the corner extension assembly.

By way of example, and referring to FIG. 1, one embodiment of a crane assembly comprises an L-plate 10 further comprising an L-plate opening 12. The L-plate 10 is joined to a first plate 16 with a first plate bolt 14. The first plate 16 further comprises a first plate lower plate fork 18 and a first plate upper plate fork 20.

A beam 22 further comprises a first beam end bearing slot 24 and joined to the first plate lower plate fork 18 with a long bearing 28, a long bearing bolt 30, a washer 32 and a nut 34. A first end spindle 26 is arranged between the first plate upper plate fork 20 and held in place with a short bearing 36, short bearing bolt 38, a washer 32 and a nut 34.

The first end spindle 26 is joined to a rod nut 40. The rod nut 40 is joined a long rod 44 with a rod coupling nut 42. A center spindle 48 is joined to a first center rod nut 40 and a second center rod nut 40. The first center rod nut 40 is joined to the long rod 44 with a first center rod coupling nut 42. The second center rod nut 40 is joined to a short rod 46 with a second center rod coupling nut 42.

The beam 22 further comprises a center beam bearing slot 50. A center bearing 52 is arranged through the center beam bearing slot 50 and held in place with a short bearing bolt 38, a washer 32 and a nut 34.

The beam 22 further comprises a second beam end bearing slot 24 and joined to a second plate lower plate fork 18 with a second long bearing 28, a second long bearing bolt 30, a second washer 32 and a second nut 34. A second end spindle 26 is arranged between the second plate upper plate fork 20 and held in place with a second short bearing 36, a second short bearing bolt 38, a second washer 32 and a second nut 34.

A second end rod nut 40 is joined to the long rod 44 with a second rod coupling nut 42. The second end spindle 26 is joined to the second rod coupling nut 42. A second plate 16 is joined to the second plate lower plate fork 18 and the second plate upper plate fork 20. A weight shaft 54 is attached to the second plate 16. Weights 56 are attached to the weight shaft 54 with a weight clamp 58.

A gold coated U-beam support 60 is joined to the center spindle 48 and the center bearing 52. A support post 62 is attached to the gold coated U-beam support 60 and rests inside a gold coated support plate 64. A plurality of bolts 66 join the gold coated support plate 64 to a gold-coated main box support 74. Surrounding the support post 62 is a center horizontal bearing 68, an inner bearing spacer 69, an outer bearing spacer 70, a large washer 71, and held in place with a bolt 73 through a small washer 72.

The gold-coated main box support 74 is joined to a plurality of gold-coated box sleeves 75. Each gold-coated box sleeve 75 is joined to a gold-coated leg 84 with a leg nut 77, a short locking pin 78, a lockdown bolt 80, and a lockdown bolt nut 82. Each gold-coated leg 84 is attached to a gold coated drop-in leg fork 92.

The gold coated drop-in leg fork 92 further comprises shaft slots 94, peg slots 96, and a wheel 98. The wheel 98 can be held in place with a wheel bolt 100. Each gold coated drop-in leg fork 92 is connected to a pair of gold coated spreader bars 86. Each gold coated spreader bar 86 further comprises a pair of drop-in shafts 88. Each drop-in shaft 88 is connected to the gold coated drop-in leg fork 92 with a lockdown bolt 80, a lockdown bolt nut 82, and a shaft peg 90.

The L-plate 10 is attached to a camera head 104 with a camera head spindle 106 and a spindle nut 107. A camera 108 is arranged within the camera head 104.

Turning to FIGS. 11-15, a gold plated twist in spreader bar 110 is configured to accommodate a twist in shaft pin 114 on a twist-in shaft 114. Gold coated twist-in leg forks 116 are joined to the 118 shaft slots 118. The shaft slots 118 further comprises a bottom beg point of entry 120, a first twist slot 122, a top peg point of entry 124, and a second twist slot 126.

Each corner of the crane assembly is attached to a corner extension bracket 128. The corner extension bracket further comprises rear fastener holes 130 and front fastener holes 132.

The gold coated drop-in leg fork 92 further comprises a front fork hole 140 and rear fork holes 142. A plurality of long bracket bolts 134 and short bracket bolts 126 join the gold coated drop-in leg fork 92 to the corner extension bracket 128.

An alternate wheel 138 further comprises a wheel fork bracket 148 which is joined to the corner extension bracket 128. The alternate wheel 138 further comprises a vertical brake saddle 144 attached with a plurality of wheel pins 146. The alternate wheel 138 further comprises a horizontal brake saddle 150 attached into a plurality of saddle slots 152. A spring 160 is arranged between a rear spring post 154 and a plate post 158 and a spring plate 156. The horizontal brake saddle 150 further comprises saddle pins 160.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A crane assembly, configured to move a camera; the crane assembly comprising:
    a base support assembly, further comprising;
        a box support, joined to at least three box leg sleeves extending outward and downward from the box support;
        a plurality of legs, each leg joined to one of the box leg sleeves;
        a plurality of drop in leg forks, each drop in leg fork joined to at least one of the legs;
        a plurality of spreader bars, each spreader bar, joined to two of the drop in leg forks;
    a u-beam support, joined to the box support with a support plate;
    a beam, rotationally connected to the u-beam support pivoting on a bolt through the u-beam support;
    a center spindle arranged inside of the u-beam support above the beam;
    a long rod, joined to the center spindle with a first rod coupling nut;
    a second end spindle, joined to the long rod with a second rod coupling nut;
    a second end plate, joined to the second end spindle, and a second bearing arranged through the beam;
    a L-plate, joined to the second end plate; and
    a camera head joined to the L-plate with a camera head spindle.

2. The crane assembly of claim 1, further comprising:
    a short rod, joined to the center spindle with a third rod coupling nut;
    a first end spindle, joined to the short rod with a fourth rod coupling nut;
    a first end plate, joined to the second rod coupling nut and to the beam with a first bearing.

3. The crane assembly of claim 2, further comprising weights, attached to the first end plate for ballast.

* * * * *